United States Patent Office 3,433,119
Patented Mar. 18, 1969

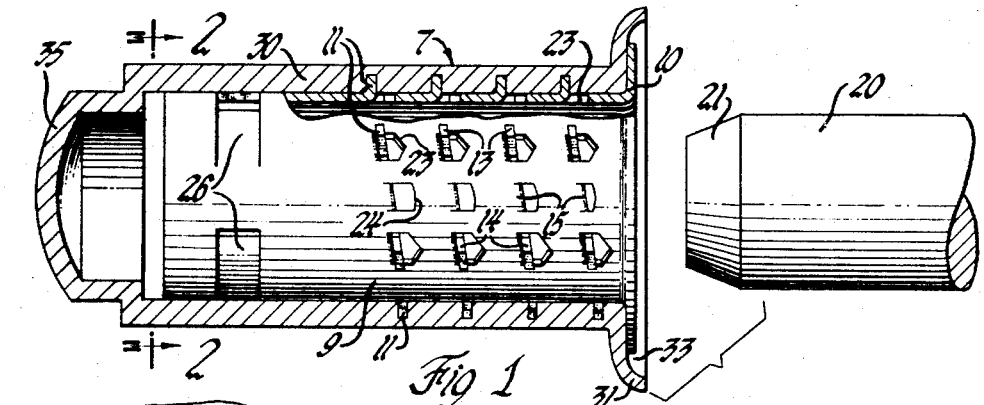
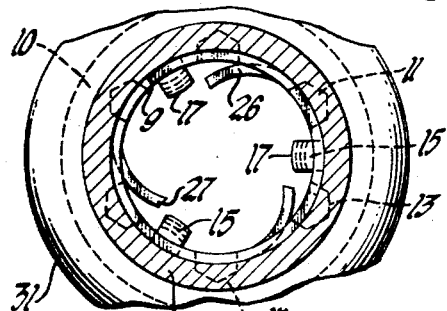
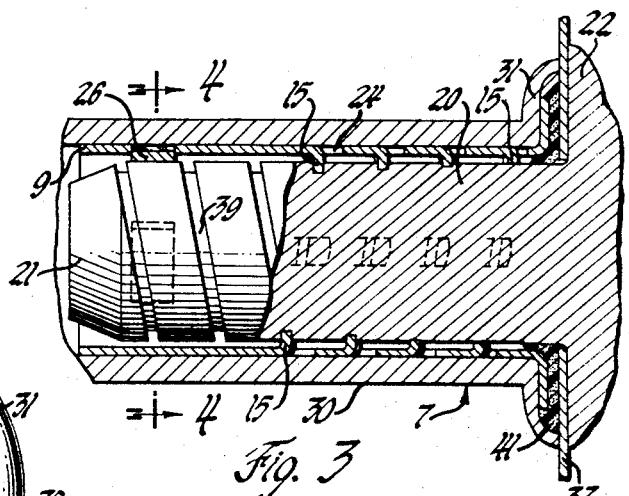
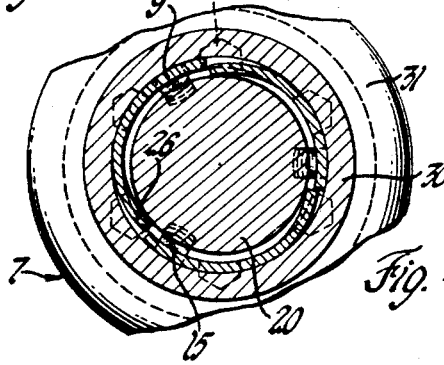
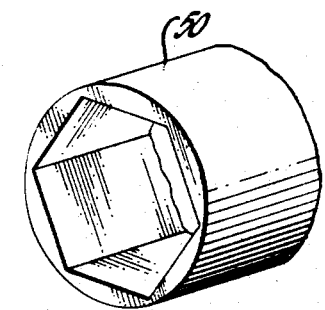
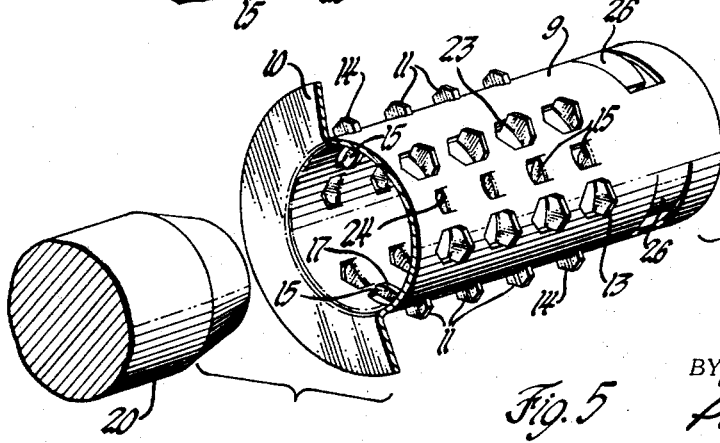
INVENTOR.
David B. Ballantyne, &
BY Maurice T. Goring
Paul Fitzpatrick
ATTORNEY

3,433,119
FASTENER
David B. Ballantyne, Southfield, and Maurice T. Goring, Detroit, Mich., assignors to General Motors Corporation, Detroit, Mich., a corporation of Delaware
Filed Nov. 10, 1966, Ser. No. 593,493
U.S. Cl. 85—32       9 Claims
Int. Cl. F16b 37/00, 27/00, 29/00

ABSTRACT OF THE DISCLOSURE

A fastener involves a cylindrical sheet metal shell with teeth struck both inwardly and outwardly from its surface. The outer teeth may be molded into a covering body or may be engaged by a wrench. The interior teeth may be molded onto a body or may be configured so as to form threads on a stud of soft material.

---

Our invention is directed to fasteners, and particularly to fasteners adapted to be threaded onto unthreaded studs and to form threads on the studs during the assembly. Such devices find use in attaching trim items and legends to the panels of automobile bodies, for instance.

Our invention is particularly directed to a simple but versatile and practical fastener which may be readily formed from sheet metal at low cost. More specifically, in its preferred embodiment, the fastener of our invention is a cylindrical body or shell having teeth extending inwardly and outwardly from the body so as to define the equivalent of interrupted threads or thread chasers on either or both of the outer and inner surfaces of the shell.

These teeth may cooperate with an exterior body to which the fastener may be threaded or which may be one molded or cast around the shell, and the teeth cooperate with a stud, acting as a nut. The exterior teeth are preferably formed so that the tips conform to the outline of the corners of a hexagon nut so that the sleeve may be driven onto a stud by an ordinary socket wrench. In most cases the body or shell preferably includes a flange at one end. It may also include circumferential projections which act to dig into the stud on any attempt to unthread the nut.

The principal objects of our invention are to provide an improved fastener, one which is very inexpensive to manufacture and effective in use, and one which is easy to install. A further object is to provide such a fastener which may readily be driven over an internal stud or into a body having a hole to receive the fastener.

The nature of our invention and the advantages thereof will be clear to those skilled in the art from the succeeding detailed description and drawings of preferred embodiments of our invention which are presented by way of disclosure and are not to be considered in a limiting sense, as many modifications may be made. Referring to the drawings:

FIGURE 1 is a composite view of an encapsulated fastener and a stud, with parts in section along the axis of the fastener.

FIGURE 2 is a transverse sectional view taken on the plane indicated by the line 2—2 in FIGURE 1.

FIGURE 3 is a similar view after the assembly of the fastener to a body which is retained on a panel.

FIGURE 4 is a transverse sectional view taken on the plane indicated by the line 4—4 in FIGURE 3.

FIGURE 5 is a composite view illustrating a stud, a fastener, and a socket wrench to drive the fastener onto the stud.

In its preferred form, our fastener 7 includes a cylindrical shell 9 having a flat flange 10 at one end. Such a shell may be formed by techniques such as those employed in the manufacture of hollow rivets or eyelets, by cutting off and flanging sections of thin-walled tubing. The tubing may be made by turning up the edges of a flat strip and joining them by tack welds or other welds, or the seam may be left open. The shell bears an array of external projections 11 distributed along lines extending axially of the shell and along a helical path starting adjacent the flange 10, these projections being disposed at 60° angles around the axis of the shell. These projections have a dihedral outer end with a central line of intersection parallel to the axis of the shell and with the planes of the outer ends conforming to a hexagonal prism, as well be clearly apparent from FIGURES 2 and 5. More specifically, surfaces such as 13 and 14 lie in a common plane and the corresponding surfaces circumferentially adjacent to these lie in planes at a 60° angle to the surfaces 13 and 14, so that these projections can fit a standard 6 or 12 point nut driving socket.

An array of internal projections 15 extend inwardly from the shell, these being distributed along the same helix as and disposed between adjacent external projections. The internal projections 15 have arcuate inner ends 17 as shown most clearly in FIGURE 2, and the projections 15 increase in length from the flanged end of the shell, as is clearly apparent in FIGURE 3. The projections 15 are adapted to form threads on a cylindrical or slightly tapered metal or plastic stud 20 having a chamfered end 21, which stud may be an integral part of a body 22 such as a piece of trim associated with an automobile body panel. The external projections 11 and internal projections 15 are formed by lancing; that is, by cutting and bending outwardly or inwardly, as the case may be, tabs from the metal shell. Preferably, all of the projections follow the same helix, but this is by no means essential. It is most convenient, however, for the internal and external projections to have the same pitch and the strength of the body is improved if the projections and the openings 23 and 24 left when the projections are formed are disposed along a common helix. The projections may be formed in a sheet before it is formed into a tube or, less desirably, in the formed tube.

The shell 9 may also include several tangential projections 26 struck inwardly from the shell adjacent the end remote from flange 10, these projections having sharp edges 27 adapted to dig into the stud 20 if any attempt is made to unscrew the fastener from the stud.

The form of the fastener 7 illustrated in FIGURES 1 to 4 is encapsulated; that is, the metal shell 9 is cast or molded into an external shell 30 which may be of plastic or die cast metal, and need not have the strength required by the shell 9. The outer shell or capsule 30 may include a flange 31 bearing against flange 10 and extending beyond it, the flange being concave to define a recess 33 under which sealing material may be disposed when the fastener is used. The outer shell 30 also preferably includes a closed dome end 35. The outer shell may be formed for engagement by any sort of driver. It should be remembered that the principal function of the outer shell 30 is for ornamentation or for covering up the metal shell 9 and that the fastener is operative without the encapsulation. In the installation as illustrated in FIGURES 3 and 4, the body 22 is mounted against a panel 37 with the stud 20 extending through the panel. The composite nut 7 including the shell 9 and outer shell 30 is then threaded onto the stud, the inner projections 15 forming threads 39 in the stud and, as the assembly is completed, the locking projections 26 engaging the outer surface of the stud to prevent the nut from backing off. A sealing compound 41 may be retained within the cavity 33 of flange 31.

It may be noted that the shell 9, with slight modifications, may be driven into a body as an interior nut. In this case the outer projections 11 should be of progressively increasing length so as to form threads in the interior surface of a body such as 30 into which shell 9 is threaded. In this case, a driver having three longitudinal slots to receive the interior projections 15 may be used to rotate the shell 9. It should also be noted that the flange 10 may be omitted or may be extended to the outer margin of flange 31 so as to engage the panel 37.

FIGURE 5 illustrates the use of the shell 9 alone as a nut. In this case the external projections 14 are engaged by standard hexagon socket 50 which may be driven manually if desired, the external outline of the projections 11 engaging in the corners of the socket so that the nut may be readily driven. This form of the nut is entirely suitable where the rough exterior is not objectionable. Where it is, encapsulation is desirable.

It is also possible to thread an external member such as 30 onto the shell 9 at the same time shell 9 is being threaded onto stud 20. This would not be usual installation practice, however.

The detailed description of preferred embodiments of the invention for the purpose of explaining the principles thereof is not to be considered as limiting or restricting the invention, as many modifications may be made by the exercise of skill in the art.

We claim:
1. A fastener comprising a circumferentially continuous generally cylindrical metal shell, an array of external projections integral with and extending outwardly from the shell, the external projections being distributed in groups along lines extending parallel to the axis of the shell and having outer ends defining the vertices of a regular polygon of an even number of sides so that the projections may be engaged by a standard socket wrench to drive the fastener, an array of internal projections integral with and extending inwardly from the shell distributed in groups along substantially parallel lines extending axially of the shell alternating with the lines of the external projections, the internal projections being disposed along a helical path intersecting the said lines and increasing in length from a first end of the shell towards the other end, the said internal projections being shaped to form a thread on a stud or the like.

2. A fastener as recited in claim 1 including also a flange extending outwardly from one end of the shell.

3. A fastener as recited in claim 1 in which both the external and internal projections are distributed along a common helical path.

4. A fastener comprising a rigid circumferentially continuous generally cylindrical metal shell adapted to resist significant forces generated during thread forming on a stud and exerted radially outward on the shell without substantial radial expansion of the shell, an array of external projections integral with the shell and extending outwardly from the shell, the said projections being distributed in groups along substantially parallel lines extending axially of the shell and distributed around the circumference of the shell, an array of internal projections integral with and extending inwardly from the shell distributed in groups along substantially parallel lines extending axially of the shell between the lines of the external projections, the internal projections being disposed along a helical path intersecting the said lines and increasing in length from a first end of the shell towards the other end, the said internal projections extending substantially perpendicular to the axis of the shell so as to be adapted to exert force radially inward of the shell, the said internal projections being shaped to form a thread on a stud or the like.

5. A fastener as recited in claim 4 in which the projections are struck from the body of the shell.

6. A fastener as recited in claim 4 in which the said lines extend parallel to the axis of the shell and the external projections have outer ends defining the vertices of a regular polygon so that the projections may be engaged by a wrench to drive the fastener.

7. A fastener as recited in claim 4 including also a flange extending outwardly from one end of the shell.

8. A fastener as recited in claim 4 in which both the external and internal projections are distributed along a common helical path.

9. A fastener as recited in claim 4 including also an encapsulating shell locked to the said cylindrical shell by the said external projections.

References Cited

UNITED STATES PATENTS 689,555 12/1901 Mann et al.
1,855,482 4/1932 McArthur.

FOREIGN PATENTS 6408852 2/1965 Netherlands.

EDWARD C. ALLEN, *Primary Examiner.*

U.S. Cl. X.R.

85—35, 47; 151—24; 333—29; 340—174